United States Patent
Cheung

(10) Patent No.: US 8,460,457 B2
(45) Date of Patent: Jun. 11, 2013

(54) ROBUST AIR-DETRAINING FOR CEMENT MILLING

(75) Inventor: Josephine Cheung, Lexington, MA (US)

(73) Assignee: W. R. Grace & Co.-Conn., Columbia, MD (US)

( * ) Notice: Subject to any disclaimer, the term of this patent is extended or adjusted under 35 U.S.C. 154(b) by 0 days.

(21) Appl. No.: 13/389,624

(22) PCT Filed: Aug. 5, 2010

(86) PCT No.: PCT/US2010/044524
§ 371 (c)(1),
(2), (4) Date: Feb. 9, 2012

(87) PCT Pub. No.: WO2011/022217
PCT Pub. Date: Feb. 24, 2011

(65) Prior Publication Data
US 2012/0137932 A1    Jun. 7, 2012

Related U.S. Application Data

(60) Provisional application No. 61/235,580, filed on Aug. 20, 2009.

(51) Int. Cl.
*C04B 24/02* (2006.01)
*C04B 24/12* (2006.01)

(52) U.S. Cl.
USPC .................. 106/724; 106/727; 106/739

(58) Field of Classification Search
USPC .......................... 106/724, 727, 739
See application file for complete search history.

(56) References Cited

U.S. PATENT DOCUMENTS

| | | | | |
|---|---|---|---|---|
| 2,776,901 A | * | 1/1957 | Scripture, Jr. | 106/810 |
| 2,776,902 A | * | 1/1957 | Scripture, Jr. | 106/802 |
| 2,776,903 A | * | 1/1957 | Scripture, Jr. | 106/806 |
| 4,943,323 A | | 7/1990 | Gartner et al. | |
| 4,961,790 A | * | 10/1990 | Smith et al. | 106/823 |
| 5,017,234 A | | 5/1991 | Gartner et al. | |
| 5,084,103 A | | 1/1992 | Myers et al. | |
| 5,156,679 A | | 10/1992 | Gartner et al. | |
| 5,429,675 A | | 7/1995 | Cheung et al. | |
| 5,938,835 A | * | 8/1999 | Shawl et al. | 106/724 |
| 6,048,393 A | * | 4/2000 | Cheung et al. | 106/727 |
| 6,213,415 B1 | | 4/2001 | Cheung | |
| 6,800,129 B2 | | 10/2004 | Jardine et al. | |
| 7,308,938 B1 | | 12/2007 | Chatterji et al. | |

(Continued)

OTHER PUBLICATIONS

Young, Form/PCT/ISA/210, International Search Report, International application No. PCT/US2010/044524, Sep. 30, 2010, 2 pages.

(Continued)

*Primary Examiner* — Paul Marcantoni
(74) *Attorney, Agent, or Firm* — Craig K. Leon; Stephen P. Williams

(57) ABSTRACT

The present invention discloses compositions and methods wherein air entrained in cementitious materials at least one air-entraining cement additive is detrained using an ethoxylated, propoxylated fatty alcohol or alkylphenol having robustness for withstanding the harsh temperature and mechanical shearing effects of cement grinding mills. Exemplary air-entraining cement additives include a tertiary alkanolamine, a lignosulfonic acid or salt thereof, naphthalene sulfonate formaldehyde condensate, melamine sulfonate formaldehyde condensate, a glycol, a glycerin, or mixtures thereof.

12 Claims, 2 Drawing Sheets

U.S. PATENT DOCUMENTS

| | | | |
|---|---|---|---|
| 2002/0055559 | A1 | 5/2002 | Kistenmacher et al. |
| 2005/0188896 | A1 | 9/2005 | Bury et al. |
| 2006/0039233 | A1 | 2/2006 | Farrington et al. |
| 2006/0086291 | A1* | 4/2006 | Jardine .......................... 106/757 |
| 2007/0266905 | A1* | 11/2007 | Amey et al. ................... 106/802 |
| 2009/0031924 | A1 | 2/2009 | White et al. |
| 2012/0137932 | A1* | 6/2012 | Cheung ......................... 106/708 |

OTHER PUBLICATIONS

Young, Form/PCT/ISA/237, Written Opinion of the International Searching Authority, International application No. PCT/US2010/044524, Sep. 30, 2010, 7 pages.

\* cited by examiner

ROBUST AIR-DETRAINING FOR CEMENT MILLING

This application is a 371 of application PCT/US2010/044524 filed Aug. 5, 2010, which claims priority from U.S. provisional application Ser. No. 61/235,580, filed Aug. 20, 2009.

FIELD OF THE INVENTION

This invention relates to additives for hydratable cement, and more particularly to the use of certain air-entraining cement additive or additives and an ethoxylated, propoxylated fatty alcohol or alkylphenol for detraining air produced by the air-entraining cement additive or additives in cement grinding.

BACKGROUND OF THE INVENTION

U.S. Pat. Nos. 4,943,323, 5,017,234, and 5,084,103 and EP 0415799B1 of Gartner et al. disclosed the use of triisopropanolamine (hereinafter "TIPA") for enhancing the late day strength (e.g., at 7- and 28-days) of cement and blended cement. This additive could be admixed with cement powder or interground as an addition with cement clinker during finish milling.

The term "cement" is used to refer to a binder material that, when mixed with water, forms a paste that hardens slowly to form rock-hard products such as mortar or concrete. Portland cement is distinguished from other cements by the different components of which it is composed, and the requirement that it meet particular standard specifications established in each country. For example, in the United States, the American Society for Testing and Materials (ASTM), American Association of State Highway and Transportation Officials, and other government agencies have set certain basic standards for cement which are based on principal chemical composition requirements of the clinker and principal physical property requirements of the final cement mix.

For purposes of this invention, the term Portland cement is intended to include all cementitious compositions meeting the requirements of the ASTM (as designated by ASTM Specification C150). Portland cement is prepared by sintering a mixture of components including calcium carbonate (as limestone), aluminum silicate (as clay or shale), silicon dioxide (as sand) and miscellaneous iron oxides. During sintering, chemical reactions take place wherein hardened nodules, commonly called clinkers, are formed. Portland cement clinker is formed by the reaction of calcium oxide with acidic components to give primarily tricalcium silicate, dicalcium silicate, tricalcium aluminate, and a ferrite solid solution phase approximating tetracalcium aluminoferrite ($C_4AF$).

After the clinker has cooled, it is then pulverized together with a small amount of gypsum (calcium sulfate) in a finish grinding mill to provide a fine, homogeneous powdery product known as Portland cement.

The term "blended cements" typically refers to a combination of Portland cement and secondary cementitious materials. Because of the rigid compositional and physical requirements for forming suitable Portland cement clinker, such cement clinker becomes a relatively expensive raw material. Thus, for certain applications, it is possible to substitute a portion of the Portland cement with secondary cementitious materials such as less expensive fillers or clinker substitutes including limestone, ground granulated blast furnace slag, fly ash, natural or artificial pozzolan, and the like.

As used herein, the term filler typically is used to refer to an inert material that has no later age strength enhancing attributes.

The term "clinker substitute" refers to a material that may contribute to long term compressive strength enhancement, but usually exhibits little or no enhancement of 7- or 28-day compressive strength. The addition of these fillers or clinker substitutes to form "blended cements" is limited in practice by the fact that such addition usually results in a diminution in the physical strength properties of the resultant cement. For example, when filler material such as limestone is blended with cement in amounts greater than 5%, the resultant cement exhibits a marked reduction in strength, particularly with respect to the strength attained after 28 days of moist curing (28-day strength). The 28-day strength has particular significance and will be emphasized throughout this invention since it is the strength at this age which is most commonly used to assess the engineering properties of the final cement products.

It was observed by Gartner et al. that the addition of triisopropanolamine ("TIPA") to cement or blended cement, while enhancing the later age strength of the cement, also tended to increase the amount of air entrained in the cement (U.S. Pat. No. 4,943,323, column 6, lines 34 et seq.). Analysis of various cement samples revealed an increase in air entrainment of about 2% when compared to cement that did not contain TIPA. Hence, the use of an air detraining agent or "air detrainer" was proposed for eliminating the increased air entrainment in the cement due to the presence of TIPA. Gartner et al. suggested that the air detrainer should be compatible with TIPA in that the detrainer should not degrade TIPA and that TIPA be soluble therein or made soluble by addition of further ingredients.

Gartner et al. therefore described suitable air detraining agents to include nonionic surfactants such as phosphates, including tributylphosphate, phthalates including diisodecylphthalate, and block copolymers including polyoxypropylene-polyoxyethylene-block copolymers (U.S. Pat. No. 4,943,323, Column 6, lines 50-55). For the purpose of withstanding the heat generated by the grinding of clinker in a cement grinding mill, the inventors preferred using nonionic polyoxypropylene-polyoxy-ethylene block copolymers having molecular weight of at least 2500 (U.S. Pat. No. 4,943, 323, Col. 6, lines 62-66).

In U.S. Pat. No. 5,156,679, Gartner et al. taught the use of water-soluble alkylated alkanolamine salts for detraining air in hydraulic cement structures, and in particular concretes. Added as admixtures to cement, these materials included N-alkylalkanolamine and N-alkyl-hydroxylamine. In example 1, Gartner et al. demonstrated that when TIPA was added to a mortar mix in the amount of 0.02% by weight as part of the water of hydration along with 0.01% by weight of dibutylamino-2-butanol ("DBAB") as defoaming agent, the mortar mix demonstrated a reduction in air entrainment (Col. 5, line 51-Col. 6, line 14).

While the above-mentioned air detrainers may be suitable for detraining air when incorporated directly into cement mortar, the heat and humidity of the grinding mill environment, coupled with the alkaline condition of the cement and the grinding-shearing forces imposed by the mechanical process of the grinding, tend to degrade the molecular structure of the defoamer, sometimes to the point at which it begins to entrain air rather than to detrain it.

U.S. Pat. No. 5,429,675 of Cheung et al. disclosed grinding aid compositions for grinding clinker into hydraulic cement powder, wherein the grinding aid comprised a mixture of at least one alkylene glycol and particulate carbon in a weight ratio of 1:0.1 to 1:0.5. The grinding aid composition could optionally contain alkanolamines with at least one $C_2$-$C_3$ hydroxyalkyl group.

When concrete is formed, it requires mixing of the various components such as hydraulic cement, sand, gravel, water, and possibly chemical additives and/or admixtures to form a substantially uniform mixture. In the course of mixing, air becomes entrapped in the composition and much of this air remains in the resultant cured composition in the form of air voids. If void size is small, the mix is said to be "air entrained." In most instances, a small amount of air entrainment is tolerated and, in certain instances, it is desired to enhance durability to freeze/thaw cycles in the environment. However, air entrainment in the hydraulic cement composition is not a desirable feature as it causes the resultant structure to have lower compressive strength than the mixture design is capable of attaining. There is an inverse relationship between air entrainment and compressive strength. It is generally believed that for each volume percent of air voids (bubbles) in a concrete mass, there exists a five percent loss of compressive strength.

Various materials are presently used in the concrete industry to reduce the amount of air contained in cured hydraulic cement compositions. Conventional air-detraining agents are generally viewed as surfactants having low hydrophilic-lipophilic balance (HLB) values, such as tri-n-butylphosphate, n-octanol and the like. Normally, these agents have been found difficult and somewhat ineffective to use in commercial applications for several reasons. Firstly, they cannot be readily introduced into dry concrete mixes due to the difficulty in dispersing the additive throughout the cement to provide a uniform distribution of the small amount of agent required. Further, the conventional air detrainers are not miscible with and, therefore, not capable of being added with other conventional cement admixtures as such admixtures are invariably water-based compositions. When it is attempted to incorporate an air-detrainer into an aqueous admixture composition, it tends to separate out and is not properly supplied to the cement composition to be treated. "Water-dispersible" air-detrainers were introduced in an attempt to overcome this problem. These agents still have low HLB values and are actually not water soluble but merely have densities close to that of water. These agents phase-segregate and are unstable in aqueous suspension in storage and, thus, have the same defects of prior known air-detrainers.

Air-detraining agents are generally very powerful in their effectiveness and, therefore, must be used in very small amounts which must be substantially uniformly distributed throughout the cement composition being treated. Presently known air-detraining agents have the disadvantages of being difficult to monitor and control in terms of dosage and distribution in cement compositions, thus causing the composition to exhibit unwanted variation from the desired degree of aeration (due to over or under dosage) and/or variation in aeration within the formed structure (due to poor distribution of agent).

Thus, a novel composition and method are required for enhancing early and late strength (i.e., early strength=1-3 days after water is added to the cement to initiate hydration; late strength=7- and 28-days after water is added to the cement to initiate hydration) in cements using at least one air-entraining cement additive, of which TIPA is an example, while also achieving robust air detrainment that survives the harsh cement milling conditions and enables strength of the mortar to be preserved.

SUMMARY OF THE INVENTION

In contrast to the prior art, the present invention provides a novel method for preparing cements, an additive composition for preparing cements, and cementitious compositions having air detrainment properties.

An exemplary process of the present invention for preparing a hydratable cement, comprises: introducing to cement clinker, before, during, or after the grinding manufacturing process whereby the clinker is ground to produce hydratable cementitious binder material, (a) at least one air-entraining cement additive in the amount of 0.0005% to 0.2% based on weight of clinker being ground, said at least one air-entraining cement additive comprising a tertiary alkanolamine, a lignosulfonic acid or salt thereof, naphthalene sulfonate formaldehyde condensate, melamine sulfonate formaldehyde condensate, a glycol, a glycerin, or mixtures thereof; and (b) an air-detraining ethoxylated, propoxylated fatty alcohol or alkylphenol represented by formula (I) or (II):

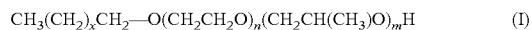

$$CH_3(CH_2)_xCH_2-O(CH_2CH_2O)_n(CH_2CH(CH_3)O)_mH \quad (I)$$

$$R^1-R^2-O(CH_2CH_2O)_n(CH_2CH(CH_3)O)_mH \quad (II)$$

wherein "x" represents an integer of =2-18; "n" and "m" each represent an integer of 3 to 15; $R^1$ represents an alkyl group having 4 to 12 carbons (and preferably $R^1$ represents a linear $C_9H_{19}$ group); and $R^2$ represents a benzene ring; said tertiary alkanolamine and said ethoxylated, propoxylated fatty alcohol or alkylphenol (both hereinafter referred to as "EPFA") being employed in the ratio (tertiary alkanolamine:EPFA) of 19:1 to 1:1 by dry solids weight.

Preferably, components (a) and (b) are introduced to said cement clinker in the form of a homogeneous aqueous liquid solution wherein the at least one air-entraining cement additive and the ethoxylated, propoxylated fatty alcohol or alkylphenol are pre-mixed together uniformly within said solution. More preferably, the homogeneous aqueous liquid solution further comprises one or more cement additives which may include additional cement additives. For example, the liquid solution may comprise a number of cement-entraining additives, such as a combination of tertiary alkanolamines (e.g., TIPA, TEA) and a glycol.

The foregoing process may be applied to cementitious materials other than cement clinker, such as fly ash, granulated blast furnace slag, limestone, natural or artificial pozzolan, or mixtures thereof.

An exemplary additive of the invention for modifying a hydratable cementitious binder material comprises: a homogenous aqueous liquid solution comprising (a) at least one air-entraining cement additive in the amount of 0.0005% to 0.2% based on weight of clinker being ground, said at least one air-entraining cement additive comprising a tertiary alkanolamine, a lignosulfonic acid or salt thereof, naphthalene sulfonate formaldehyde condensate, melamine sulfonate formaldehyde condensate, a glycol, a glycerin, or mixtures thereof; and (b) an air-detraining ethoxylated, propoxylated fatty alcohol or alkylphenol (both hereinafter referred to as "EPFA") having the representative formula (I or II) as described above.

The invention is also directed to hydratable cementitious compositions resulting from use of the above-described process and additive examples.

The term "homogeneous aqueous liquid solution," as used to describe preferred additives of the invention, refers to a liquid solution which is substantially clear (non-turbid) and having essentially no discontinuous liquid phases or undissolved particles (such as dispersed solid salt particles) within the aqueous liquid. Cement manufacturers prefer to use clear aqueous solutions because they do not want components to separate from liquid; they want components dissolved and homogeneously distributed. This avoids pumping difficulties caused by precipitates and particle suspensions. The use of EPFA to detrain air generated by the air-entraining cement additive component (e.g., tertiary alkanolamine) during cement grinding is believed to be surprising given that EPFA is essentially non-water-soluble in nature. The miscibility of TIPA with EPFA and water thus surprisingly enables formulation of an easily liquid-dispensed, meterable aqueous solution. Use of aqueous solutions avoids the need for viscosity modifying agents that can also complicate pumping.

In achieving uniformity and homogeneity in the aqueous solution, the present invention also enables the production of cement that is consistent throughout the production process as well as in the mortar or concrete in which it is used.

Further advantages and benefits of the present invention are discussed in further detail hereinafter.

DETAILED DESCRIPTION OF EXEMPLARY EMBODIMENTS

Figure 1:
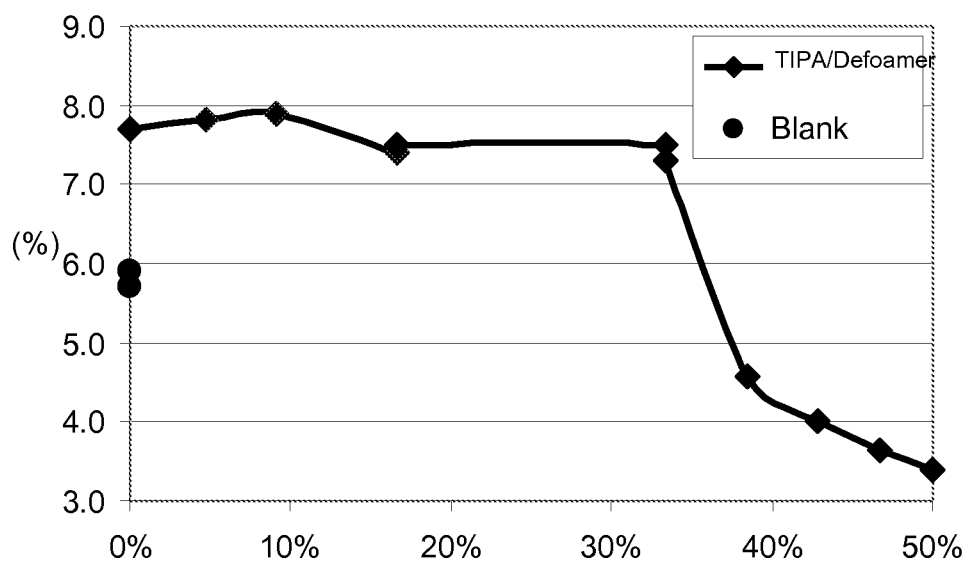
FIG. 1 is a graphic illustration of use in an Ordinary Portland Cement ("OPC") of an exemplary ethoxylated, propoxylated fatty alcohol surface active agent used in varying percentages within an exemplary air-entraining cement additive (TIPA) as a function of air content.

Additive compositions of the invention comprise the use of (A) at least one air-entraining cement additive comprising a tertiary alkanolamine, a lignosulfonic acid or salt thereof, naphthalene sulfonate formaldehyde condensate, melamine sulfonate formaldehyde condensate, a glycol, a glycerin, or mixtures thereof; and (B) an air-detraining ethoxylated, propoxylated fatty alcohol or alkylphenol in "hydratable cementitious binder materials," a term which may be used interchangeably with the term "cement" and which is intended to include Portland cement, one or more secondary cementitious materials (e.g., fly ash, granulated blast furnace slag, limestone, natural or artificial pozzolan), or mixtures thereof. An example of natural pozzolan is volcanic ash.

Exemplary tertiary alkanolamines suitable for use in the invention may include triethanolamine (TEA), triisopropanolamine (TIPA), diethanol isopropanolamine (DEIPA), ethanol diisopropanolamine (EDIPA), tetra(hydroxyethyl)ethylene diamine (THEED), and tetra(hydroxypropyl)ethylene diamine (THPED), methyl diethanolamine (MDEA), and mixtures thereof.

An exemplary lignosulfonic acid or salt thereof suitable for use in the invention includes calcium lignosulfonate, sodium lignosulfonate, and the like.

Exemplary glycols suitable for use in the invention include polyethylene glycol, diethylene glycol, propylene glycol, dipropylene glycol, and mixtures thereof.

Such hydratable cementitious binder materials function, when water is added in sufficient amount to initiate the hydration reaction, to bind and to hold together fine aggregates (e.g., sand) to form cement mortars, and, when coarse aggregates (e.g., crushed gravel) are added, to form concrete.

The additives (or additive compositions) of the invention are contemplated to be introduced before, during, or after the grinding of cement clinker to produce finished cement and blended cements. For example, the additives may be combined directly with the clinker, directly with supplementary cementitious materials to be combined with the clinker (e.g., at the fly ash plant or slag recovery process), or otherwise introduced directly into conventional grinding mills, such as ball mills (or tube mills). The present inventors also believe that they can be applied in mills employing rollers (e.g., vertical rollers, rollers on tables, etc.). See e.g., U.S. Pat. No. 6,213,415 of Cheung.

The term "hydratable" as used herein is intended to refer to cement or cementitious binder materials that are hardened by chemical interaction with water. Portland cement clinker is a partially fused mass primarily composed of hydratable calcium silicates. The calcium silicates are essentially a mixture of tricalcium silicate ($3CaO.SiO_2$ "$C_3S$" in cement chemists notation) and dicalcium silicate ($2CaO.SiO_2$, "$C_2S$") in which the former is the dominant form, with lesser amounts of tricalcium aluminate ($3CaO.Al_2O_3$, "$C_3A$") and tetracalcium aluminoferrite ($4CaO.Al_2O_3.Fe_2O_3$, "$C_4AF$"). See e.g., Dodson, Vance H., *Concrete Admixtures* (Van Nostrand Reinhold, New York N.Y. 1990), page 1.

As disclosed in U.S. Pat. No. 4,943,323, U.S. Pat. No. 5,017,234, U.S. Pat. No. 5,084,103 and EP0415799B1, owned by the common assignee hereof, the use of triisopropanolamine ("TIPA"), a tertiary alkanolamine, in an amount of 0.0005% to 0.2% by weight of cement (e.g., the hydratable cementitious binder material that may include Portland cement along with any secondary cementitious materials) was shown to enhance 7- and 28-day strength of Portland cement or blended cement having at least 4% calcium aluminoferrite ($C_4AF$) by weight based on total weight of cement clinker used in grinding to provide the cement. Such late day (or late age) enhancement of the compressive strength was particularly valuable for use in blended cements containing limestone or other filler or substitute components that otherwise decrease late day strength.

The term "homogenous aqueous liquid solution" as used herein to refer to the additive composition used for preparing cement, means and refers to a water-based solution having essentially no separable layers, portions, or phases, no discontinuous liquid phases; and no undissolved solid particles dispersed within the aqueous liquid. The components of such a homogenous aqueous liquid solution should also be uniformly distributed in equal proportion throughout the entire volume of the solution.

As summarized above, an exemplary process for preparing a hydratable cement, comprises: introducing to cement clinker, before, during, or after the grinding manufacturing process whereby the clinker is ground to produce hydratable cementitious binder material, (a) at least one air-entraining cement additive, comprising a tertiary alkanolamine, a lignosulfonic acid or salt thereof, naphthalene sulfonate formaldehyde condensate, melamine sulfonate formaldehyde condensate, a glycol, a glycerin, or mixture thereof, in the amount of 0.0005% to 0.2% based on weight of clinker being ground; and (b) an air-detraining ethoxylated, propoxylated fatty alcohol or alkylphenol represented by formula (I) or (II):

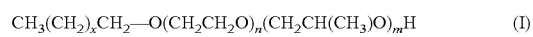

$$CH_3(CH_2)_xCH_2-O(CH_2CH_2O)_n(CH_2CH(CH_3)O)_mH \quad (I)$$

$$R^1-R^2-O(CH_2CH_2O)_n(CH_2CH(CH_3)O)_mH \quad (II)$$

wherein "x" represents an integer of =2-18; "n" and "m" each represent an integer of 3 to 15; $R^1$ represents an alkyl group having 4 to 12 carbons (and preferably $R^1$ represents a linear $C_9H_{19}$ group); and $R^2$ represents a benzene ring; said tertiary alkanolamine and said ethoxylated, propoxylated or alkylphenol (both hereinafter referred to as "EPFA") being employed in the ratio (tertiary alkanolamine:EPFA) of 19:1 to 1:1 by dry solids weight.

As mentioned in the foregoing summary section, the invention may be applied to cementitious materials in addition to cement clinker. Thus, a further exemplary process of the invention, comprises: introducing to a cementitious material before, during, or after grinding said cementitious material to produce a hydratable cementitious binder material, said cementitious material being selected from the group consisting of clinker, fly ash, granulated blast furnace slag, limestone, natural or artificial pozzolan, or mixture thereof; (a) at least one air-entraining cement additive comprising a tertiary alkanolamine, a lignosulfonic acid or salt thereof, naphthalene sulfonate formaldehyde condensate, melamine sulfonate formaldehyde condensate, a glycol, a glycerin, or mixture thereof tertiary alkanolamine, in the amount of 0.0005% to 0.2% based on weight of cementitious material being ground; and (b) an air-detraining ethoxylated, propoxylated fatty alcohol or alkylphenol represented by formula (I) or (II):

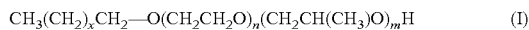

$$CH_3(CH_2)_xCH_2\text{—}O(CH_2CH_2O)_n(CH_2CH(CH_3)O)_mH \quad (I)$$

$$R^1\text{—}R^2\text{—}O(CH_2CH_2O)_n(CH_2CH(CH_3)O)_mH \quad (II)$$

wherein "x" represents an integer of =2-18; "n" and "m" each represent an integer of 3 to 15; $R^1$ represents an alkyl group having 4 to 12 carbons (and preferably $R^1$ represents a linear $C_9H_{19}$ group); and $R^2$ represents a benzene ring; said tertiary alkanolamine and said ethoxylated, propoxylated fatty alcohol or alkylphenol (both hereinafter referred to as "EPFA") being employed in the ratio (tertiary alkanolamine:EPFA) of 19:1 to 1:1 by dry solids weight.

Hydratable cement powders is produced by this method have lower entrained air, when water is mixed to initiate hydration of the hydratable cementitious binder material and the hydratable cementitious binder material is allowed to harden into a structure, compared to hydratable cementitious binder material made with tertiary alkanolamine but without the use of the EPFA.

An exemplary additive of the invention for modifying a hydratable cementitious binder material, comprises: a homogenous aqueous liquid solution comprising (a) at least one air-entraining cement additive in the amount of 0.0005% to 0.2% based on weight of clinker being ground, said at least one air-entraining cement additive comprising a tertiary alkanolamine, a lignosulfonic acid or salt thereof, naphthalene sulfonate formaldehyde condensate, melamine sulfonate formaldehyde condensate, a glycol, a glycerin, or mixture thereof; and (b) an air-detraining ethoxylated, propoxylated fatty alcohol or alkylphenol (both hereinafter referred to as "EPFA"), as previously described above.

In preferred processes and additives of the invention, the amount of EPFA used is preferably greater than 5%, and more preferably greater than 10%, by weight of total solids of air-entraining cement additive (e.g., tertiary alkanolamine such as triisopropanolamine and/or triethanolamine) being added to the clinker. The EPFA may also be used most preferably in amounts of at 0.0005% to 20% by weight of total solids of air-entraining material added to clinker, depending also on the nature of the cement.

Hydratable cement powder is produced having higher compressive strength and lower entrained air, when water is mixed to initiate hydration of the hydratable cementitious binder material and said hydratable cementitious binder material is allowed to harden into a structure, when compared to hydratable cementitious binder material made with an air-entraining cement additive (e.g., TIPA) but without the use of said EPFA.

In other exemplary embodiments, one or more conventional cement additives may be introduced to the cement clinker, before, during, or after the grinding manufacturing process whereby the clinker is ground to produce hydratable cementitious binder material, as previously discussed above. Such conventional cement additives may include an alkanolamine other than a tertiary alkanolamine, a chloride salt (e.g., calcium chloride, sodium chloride), a sugar (e.g., glucose, fructose, corn syrup, molasses, etc.) or a carbohydrate (e.g., sodium gluconate, potassium gluconate), a nitrite (e.g., calcium nitrite, sodium nitrite), a nitrate (e.g., calcium nitrate, sodium nitrate), a thiocyanate (e.g., sodium thiocyanate), biodiesel production byproducts (e.g., bio-glycerin), or mixtures thereof.

Such further cement additives may be incorporated in the amounts as desired (e.g., 0.0002%-0.1% by weight total solids within the additive composition). Hence, various combinations of TIPA with one or more other alkanolamines are contemplated within the present invention and are believed to be benefitted by the air-detraining effects of EPFA.

Most preferably, the TIPA and EPFA, along with optional cement additives, are added as a single component, before, during, or after the clinker grinding process, in the form of a homogeneous aqueous liquid solution wherein the components are pre-mixed together uniformly within solution.

In preferred cementitious compositions and methods of the invention, the cement clinker employed has a tetracalcium alumino ferrite ($C_4AF$) content of at least 4% by weight of the cement clinker. According to U.S. Pat. Nos. 4,943,323, 5,017, 234, and 5,084,103 and EP 0415799B1 of Gartner et al., this $C_4AF$ content enables triisopropanolamine ("TIPA") to enhance late day strength of cements having this requisite level of $C_4AF$. The preferred dosage of TIPA would be 0.0005%-0.2% based on weight of the cement clinker.

In further preferred embodiments, TIPA is combined with TEA, DEIPA, EDIPA, THEED, and/or THPED. The preferred ranges 0.005%-0.1% by weight total solids of each component within the additive composition. With respect to alkanolamines such as TIPA, TEA, DEIPA, THEED, and combinations thereof, these components may be incorporated with the hydratable cementitious binder material before, during, or after grinding.

While the invention is described herein using a limited number of embodiments, these specific embodiments are not intended to limit the scope of the invention as otherwise described and claimed herein. Modification and variations from the described embodiments exist. More specifically, the following examples are given as a specific illustration of embodiments of the claimed invention. It should be understood that the invention is not limited to the specific details set forth in the examples. All parts and percentages in the examples, as well as in the remainder of the specification, are by percentage weight unless otherwise specified.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. For example, whenever a numerical range with a lower limit, RL, and an upper limit RU, is disclosed, any number R falling within the range is specifically disclosed. In particular, the following numbers R within the range are specifically disclosed: R=RL+k*(RU−RL), where k is a variable ranging from 1% to 100% with a 1% increment, e.g., k is 1%, 2%, 3%, 4%, 5% ... 50%, 51%, 52% ... 95%, 96%, 97%, 98%, 99%, or 100%. Moreover, any numerical range represented by any two values of R, as calculated above, is also specifically disclosed.

EXAMPLE 1

Comparative Example

A comparative example was done to demonstrate that an ethoxylated, propoxylated fatty alcohol surface active agent (hereinafter "EPFA"), as previously described hereinabove, has air-detraining (defoaming) capabilities when used at or above a certain dosage with the air-entraining cement additive triisopropanolamine ("TIPA").

A cement mortar was made using Ordinary Portland Cement (OPC) in accordance with EN-196 (1995), and air content was measured using a standard air cup in accordance with ASTM C-185 (2005). The composition of the OPC was determined by quantitative x-ray diffraction to contain 65.5% alite, 8.9% belite, 8.4% $C_4AF$, 1.9% cubic $C_3A$, 2.7% orthorhombic $C_3A$, 3.1% periclase, 1.3% portlandite, 1.0% arcanite, 3.4% calcite, 0.6% gypsum, 2.1% plaster and 0.9% calcium sulfate anhydrite.

Another cement mortar was made using the same cement, and TIPA was incorporated in the amount of 200 ppm by weight of the cement and incorporated in the hydration water. The air content of this sample was then measured using the air cup.

Further mortars were made using the same cement, and 200 ppm of TIPA was incorporated along with varying dosages of EPFA (commercially available as a surface active agent from Huntsman Corporation under the tradename SURFONIC® LF-68) in the amount of 0-50% percentage based on dry weight solids of the additive composition being added to the mortar cement.

The results are graphically plotted in FIG. 1, wherein the varying amounts of EPFA surfactant are plotted along the horizontal axis against percentage of air content measured in the cement mortar and plotted along the vertical axis. FIG. 1 indicates that addition of 200 ppm of TIPA increased the air content of the cement by around 2%. (The blank sample measured 5.9% air content, whereas addition of 200 ppm of TIPA increased the air content to about 7.8%). FIG. 1 also indicates that the amount of EPFA was not effective to detrain the air content generated by the addition of TIPA until EPFA dosage was more than 30% by total solids.

EXAMPLE 2

Comparative Example

Another comparative example was done to demonstrate that an ethoxylated, propoxylated fatty alcohol surface active agent (hereinafter "EPFA") has air-detraining (defoaming) capabilities when used at or above a certain minimum dosage with air-entraining triisopropanolamine ("TIPA"). However, a different Ordinary Portland Cement (OPC) was used, and the procedures described above for Example 1 was otherwise followed. The composition of the OPC was determined by quantitative x-ray diffraction to contain 64.1% alite, 10.0% belite, 5.4% $C_4AF$, 8.6% cubic $C_3A$, 2.9% orthorhombic $C_3A$, 2% periclase, 0.9% arcanite, 1.2% calcite and 3.9% plaster.

Figure 2:
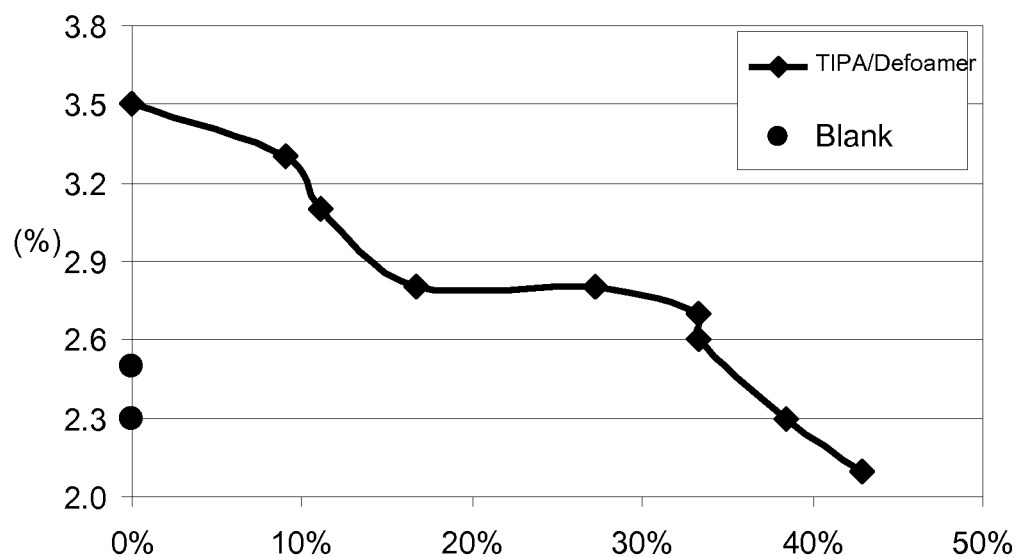
FIG. 2 is a graphic illustration of use in another OPC (obtained from a source different from the cement shown in FIG. 1) of an exemplary ethoxylated, propoxylated fatty alcohol surface active agent used in varying percentages within an additive composition having an exemplary air-entraining cement additive (TIPA) as a function of air content.

The results are graphically plotted in FIG. 2, wherein the varying amounts of EPFA surfactant are plotted along the horizontal axis against percentage of air content measured in the cement mortar and plotted along the vertical axis. FIG. 2 indicates that addition of 200 ppm of TIPA increased the air content of the cement by around 1.1%. (The blank sample measured 2.4% air content, whereas addition of 200 ppm of TIPA increased the air content to about 3.5%). FIG. 2 also indicates that the amount of EPFA was not effective to detrain the air content generated by the addition of TIPA until EPFA dosage was more than 30% by total solids.

EXAMPLE 3

The following example illustrates the surprising increase in strength enhancement by combining TIPA with EPFA as defoamer. The ASTM C109 method was employed to make the mortar.

The cement used to make the mortar was made using 95 parts of Ordinary Portland Cement (Type I as specified in ASTM C-150 (1995)) clinker and 5 parts of gypsum ground in a laboratory ball mill together with water (blank sample), with 200 ppm TIPA in water, or with 200 ppm TIPA and 40 ppm EPFA in water. Three cement samples were ground to a Blaine Specific Surface Area (BSA) of 360±7 $m^2$/kg. All grinds were made at 85-90 degrees Celcius using 3325 g of clinker and 175 g of gypsum with either 0.17% water or with a 70 weight-percent of TIPA or TIPA with EPFA.

First, it is noted that both TIPA and TIPA with EPFA as defoamer gave similar grinding efficiency. The results are tabulated in Table 1 below. Equal BSA was obtained in both of the cements made with TIPA and TIPA with EPFA at equal grinding times.

Second, when EPFA as defoamer was added into the mix or grind, lower air was observed in the mortar. Higher resultant densities of the mortar were also measured.

Third, at 1 day, no strength enhancement was noted with the addition of 200 ppm of TIPA. However, when an additional 40 ppm of EPFA was combined with the 200 ppm of TIPA, the strength of the cement mortar increased by 1 MPa (or 7%). This result was most likely a result of lower air-entrainment in the mortar. When TIPA was added as a grinding additive, it was observed that 1-day strength increased by 1.6 MPA (or 12%). When an additional 40 ppm of EPFA was added to 200 ppm of TIPA, 1-day strength was observed to increase by another 1.4 MPa (or 10%).

TABLE 1

| | | | | | ASTM C109 - 1 Day | | |
| --- | --- | --- | --- | --- | --- | --- | --- |
| OPC Grinds | BSA (m2/kg) | Time for Grind (hr:min) | Temp. (degrees Celcius) | Air (%) | MPa | % of Blank | Prism Density (g/cm3) |
| Blank | 353 | 3:00 | 27.6 | 7.4 | 14.0 | 100 | 2.15 |
| Interground 200 ppm TIPA | 364 | 2:15 | 27.2 | 8.1 | 15.6 | 112 | 2.14 |

TABLE 1-continued

| OPC Grinds | BSA (m2/kg) | Time for Grind (hr:min) | Temp. (degrees Celcius) | Air (%) | ASTM C109 - 1 Day | | Prism Density (g/cm3) |
| --- | --- | --- | --- | --- | --- | --- | --- |
| | | | | | MPa | % of Blank | |
| interground 200 ppm TIPA + 40 ppm Defoamer EPFA | 365 | 2:15 | 27.3 | 7.8 | 17.0 | 122 | 2.16 |
| Blank + admixed 200 ppm TIPA | 353 | 3:00 | 0 | 8.4 | 13.8 | 99 | 2.12 |
| Blank + admixed 200 ppm TIPA + 40 ppm Defoamer EPCA | 353 | 3:00 | 0 | 8.0 | 14.8 | 106 | 2.15 |

EXAMPLE 4

The following example is similar to Example 3 in illustrating the surprising increase in strength enhancement by combining TIPA with EPFA as defoamer. However, this time the EN-196 method was employed to make the mortar.

The cements used for this example were the same as those used in Example 3 above.

Once again, when EPFA as defoamer was added into the mix or grind, lower air was observed in the mortar, and higher resultant densities of the mortar were also measured.

At 1 day, a slight strength enhancement was noted with the addition of 200 ppm of TIPA. When 40 ppm of EPFA and 200 ppm of TIPA were added, mortar strength increased 0.8 MPa. This increase in strength was likely a result of lower air-entrainment in the mortar. When TIPA was added as a grinding additive, it was observed that 1-day strength increased by 3.0 MPa (or 24%). When an additional 40 ppm of EPFA was added to 200 ppm of TIPA, 1-day strength was observed to increase by another 2.0 MPa (or 16%).

The results are shown in Table 2 below.

TABLE 2

| OPC Grinds | BSA (m2/kg) | Time for Grind | Temp. (degrees Celcius) | Air (%) | EN 196 1 Day | | Density (g/cm3) |
| --- | --- | --- | --- | --- | --- | --- | --- |
| | | | | | MPa | %/Blank | |
| Blank | 353 | 3:00 | 21 | 4.2 | 12.6 | 100 | 2.24 |
| interground 200 ppm TIPA | 364 | 2:15 | 21 | 5.4 | 15.6 | 124 | 2.28 |
| interground 200 ppm TIPA + 40 ppm Defoamer EPCA | 365 | 2:15 | 21 | 4.2 | 17.6 | 140 | 2.29 |
| Blank + admixed 200 ppm TIPA | 353 | 3:00 | 21 | 5.5 | 13.6 | 108 | 2.26 |
| Blank + admixed 200 ppm TIPA + 40 ppm Defoamer EPCA | 353 | 3:00 | 21 | 4.2 | 14.4 | 114 | 2.27 |

The foregoing example and embodiments were present for illustrative purposes only and not intended to limit the scope of the invention.

I claim:

1. A process for preparing a hydratable cement, comprising:
   introducing to cement clinker, before, during, or after the grinding manufacturing process whereby the clinker is ground to produce hydratable cementitious binder material,
   (a) at least one air-entraining cement additive in the amount of 0.0005% to 0.2% based on weight of clinker being ground, the at least one air-entraining cement additive comprising a tertiary alkanolamine, a lignosulfonic acid or salt thereof, naphthalene sulfonate formaldehyde condensate, melamine sulfonate formaldehyde condensate, a glycol, a glycerin, or mixtures thereof; and
   (b) an air-detraining ethoxylated, propoxylated fatty alcohol or alkylphenol represented by formula (I) or (II):

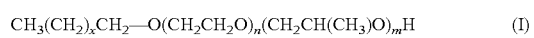

$$CH_3(CH_2)_xCH_2-O(CH_2CH_2O)_n(CH_2CH(CH_3)O)_mH \qquad (I)$$

$$R^1-R^2-O(CH_2CH_2O)_n(CH_2CH(CH_3)O)_mH \qquad (II)$$

wherein x represents an integer of =2-18; n and m each represent an integer of 3 to 15; $R^1$ represents an alkyl group having 4 to 12 carbons; and $R^2$ represents a benzene ring;
   the at least one air-entraining cement additive and the ethoxylated, propoxylated fatty alcohol or alkylphenol (both hereinafter EPFA) being present by weight within the ratio (tertiary alkanolamine: EPFA) of 19:1 to 1:1 by dry solids weight.

2. The process of claim 1 wherein the at least one air-entraining cement additive is a tertiary alkanolamine selected from the group consisting of triethanolamine, triisopropanolamine, diethanol isopropanolamine, ethanol diisopropanolamine, tetra(hydroxyethyl) ethylene diamine, tetra(hydroxypropyl) ethylene diamine, methyl diethanolamine, or mixtures thereof.

3. The process of claim 1 wherein the at least one air-entraining cement additive is triisopropanolamine.

4. The process of claim 3 further comprising at least one other air-entraining cement additive other than triisopropanolamine.

5. The process of claim 1 whereby a hydratable cement powder is produced having higher compressive strength and lower entrained air, when water is mixed to initiate hydration of the hydratable cementitious binder material and the hydratable cementitious binder material is allowed to harden into a structure, when compared to hydratable cementitious binder material made with the at least one tertiary alkanolamine but without the use of EPFA.

6. The process of claim 1 wherein the at least one air-entraining cement additive and the EPFA are introduced to the cement clinker as homogeneous aqueous liquid solution wherein the at least one air-entraining cement additive and the EPFA are mixed together uniformly within the solution.

7. The process of claim 1 wherein the EPFA is used in an amount greater than 10% by weight of total solids of air-entraining material, including the at least one air-entraining cement additive, being added to the clinker.

8. The process of claim 1 wherein the cement clinker has a $C_4AF$ content of at least 4% by weight.

9. The process of claim 1 further comprising introducing to cement clinker, before, during, or after the grinding manufacturing process whereby the clinker is ground to produce hydratable cementitious binder material, a cement additive selected from the group consisting of a chloride salt, a sugar or carbohydrate, a nitrite, a nitrate, a thiocyanate, a water reducer, or mixtures thereof.

10. A process for preparing a hydratable cementitious material, comprising:
introducing to a cementitious material before, during, or after grinding the cementitious material to produce a hydratable cementitious binder material, the cementitious material being selected from the group consisting of clinker, fly ash, granulated blast furnace slag, limestone, natural or artificial pozzolan, or mixture thereof:
(a) at least one air-entraining cement additive in the amount of 0.0005% to 0.2% based on weight of cementitious material being ground, the at least one air-entraining cement additive comprising a tertiary alkanolamine, a lignosulfonic acid or salt thereof, naphthalene sulfonate formaldehyde condensate, melamine sulfonate formaldehyde condensate, a glycol, a glycerin, or mixtures thereof; and
(b) an air-detraining ethoxylated, propoxylated fatty alcohol or alkylphenol represented by formula (I) or (II):

$$CH_3(CH_2)_xCH_2-O(CH_2CH_2O)_n(CH_2CH(CH_3)O)_mH \qquad (I)$$

$$R^1-R^2-O(CH_2CH_2O)_n(CH_2CH(CH_3)O)_mH \qquad (II)$$

wherein x represents an integer of =2-18; n and m each represent an integer of 3 to 15; $R^1$ represents an alkyl group having 4 to 12 carbons; and $R^2$ represents a benzene ring;
the at least one air-entraining cement additive and the ethoxylated, propoxylated fatty alcohol or alkyphenol (both hereinafter EPFA) being present by weight within the ratio (tertiary alkanolamine:EPFA) of 19:1 to 1:1 by dry solids weight.

11. The process of claim 1 wherein $R^1$ represents a linear $C_9H_{19}$ group.

12. The process of claim 10 wherein $R^1$ represents a linear $C_9H_{19}$ group.

* * * * *